US010894899B2

(12) United States Patent
Li et al.

(10) Patent No.: US 10,894,899 B2
(45) Date of Patent: Jan. 19, 2021

(54) NANOCELLULOSE-BASED ANTI-FOGGING COMPOSITION

(71) Applicant: THE UNIVERSITY OF MASSACHUSETTS, Boston, MA (US)

(72) Inventors: Yinyong Li, Sunderland, MA (US); Kenneth Raymond Carter, Hadley, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 16/793,021

(22) Filed: Feb. 18, 2020

(65) Prior Publication Data

US 2020/0181439 A1 Jun. 11, 2020

Related U.S. Application Data

(63) Continuation of application No. 15/767,719, filed as application No. PCT/US2016/056249 on Oct. 10, 2016, now abandoned.

(Continued)

(51) Int. Cl.
*C09D 101/00* (2006.01)
*C09D 101/02* (2006.01)
(Continued)

(52) U.S. Cl.
CPC ............ *C09D 101/02* (2013.01); *C08B 15/02* (2013.01); *C09D 7/61* (2018.01); *C09D 7/63* (2018.01);
(Continued)

(58) Field of Classification Search
None
See application file for complete search history.

(56) References Cited

U.S. PATENT DOCUMENTS

| 5,629,055 A | 5/1997 | Revol et al. |
| 5,873,931 A | 2/1999 | Scholz et al. |

(Continued)

FOREIGN PATENT DOCUMENTS

| JP | 10101816 A | 4/1996 |
| JP | 20154032 A | 8/2015 |

OTHER PUBLICATIONS

Li et al, Multi-functional coating of cellulose nanocrystals for flexible packaging applications, cellulose, vol. 20, pp. 2494-2504 (Year: 2013).*

(Continued)

*Primary Examiner* — Stefanie J Cohen
(74) *Attorney, Agent, or Firm* — Cantor Colburn LLP

(57) ABSTRACT

An anti-fogging composition is described herein. The composition includes a nanocellulose comprising cellulose nanofibrils, cellulose nanocrystals, or a combination thereof, and water. A method of preparing an anti-fogging coating includes applying the anti-fogging composition to at least a portion of a surface of a substrate to form a coating. An article including a coating formed from the anti-fogging composition is also disclosed. Coatings prepared from the anti-fogging compositions are water proof, and offer a cost-effective alternative to other anti-fogging coatings.

15 Claims, 1 Drawing Sheet

Related U.S. Application Data

(60) Provisional application No. 62/240,037, filed on Oct. 12, 2015.

(51) Int. Cl.

| | |
|---|---|
| *C09K 3/18* | (2006.01) |
| *C08B 15/02* | (2006.01) |
| *C09D 7/65* | (2018.01) |
| *C09D 7/61* | (2018.01) |
| *C09D 7/63* | (2018.01) |
| *B82Y 30/00* | (2011.01) |
| *C08K 3/36* | (2006.01) |
| *C08K 5/098* | (2006.01) |
| *C08K 3/22* | (2006.01) |
| *C08L 5/00* | (2006.01) |

(52) U.S. Cl.
CPC ............... *C09D 7/65* (2018.01); *C09K 3/18* (2013.01); *B82Y 30/00* (2013.01); *C08K 3/36* (2013.01); *C08K 5/098* (2013.01); *C08K 2003/2241* (2013.01); *C08K 2003/2296* (2013.01); *C08K 2201/005* (2013.01); *C08K 2201/008* (2013.01); *C08L 5/00* (2013.01)

(56) References Cited

U.S. PATENT DOCUMENTS

| | | |
|---|---|---|
| 7,056,874 B2 | 6/2006 | Tadrowski et al. |
| 8,287,692 B2 | 10/2012 | Miyawaki et al. |
| 8,778,134 B2 | 7/2014 | Vehvilainen et al. |
| 8,871,056 B2 | 10/2014 | Gane et al. |
| 2003/0203991 A1 | 10/2003 | Schottman et al. |
| 2004/0107672 A1* | 6/2004 | Falato ................ B29C 41/04 52/784.1 |
| 2008/0217284 A1 | 9/2008 | Roth et al. |
| 2008/0248089 A1* | 10/2008 | Bugge ................ A23G 3/54 424/440 |
| 2010/0272819 A1 | 10/2010 | Engelhardt et al. |
| 2012/0058355 A1 | 3/2012 | Lee et al. |
| 2016/0002483 A1* | 1/2016 | Zhao ................ C09D 101/02 426/102 |
| 2018/0291223 A1 | 10/2018 | Li et al. |

OTHER PUBLICATIONS

Torabi et al, The effects of sio2 nanoparticles on mechanical and physiochemical properties of potato starch films, journal of chemical health risks, vol. 3 (1), pp. 33-42 (Year: 2013).*
Fei Li, Development of Nano-material for Food Packaging, 2012.
Habibi, Youssef, et al., "Cellulose Nanocrystals: Chemistry, Self-Assembly, and Applications", Chem. Rev. 2010, 110, pp. 3479-3500.
International Search Report of the International Searching Authority for International Application No. PCT/US16/56249; Date of filing: Oct. 10, 2016; dated Dec. 27, 2016; 6 pages.
Li et al., "Multi-functional coating of cellulose nanocrystals for flexible packaging applications", Cellulose, vol. 20, Issue 5, Oct. 2013; pp. 2491-2504.
Torabi et al., "The Effects of SiO2 Nanoparticles on Mechanical and Physiochemical Properties of Potato Starch Films", Journal of Chemical Health Risks, vol. 3, No. 1, 2013; pp. 33-42.
Written Opinion of the International Searching Authority for International Application No. PCT/US16/56249; Date of filing: Oct. 10, 2016; dated Dec. 27, 2016; 6 pages.

* cited by examiner

NANOCELLULOSE-BASED ANTI-FOGGING COMPOSITION

CROSS-REFERENCE TO RELATED APPLICATIONS

This application is a continuing application of application Ser. No. 15/767,719, filed Apr. 12, 2018, now abandoned, which is a National Stage application of PCT/US2016/056249, filed Oct. 10, 2016, which claims the benefit of U.S. Provisional Application No. 62/240,037, filed Oct. 12, 2015, each of which are incorporated by reference herein in theft entirety.

STATEMENT REGARDING FEDERALLY SPONSORED RESEARCH & DEVELOPMENT

This invention was made with government support under the Materials Research Science and Engineering Center on Polymers (DMR-0820506) awarded by the National Science Foundation, and under CMMI-1025020 awarded by the University of Massachusetts Center for Hierarchical Manufacturing (CHM). The government has certain rights in the invention.

BACKGROUND

Optically clear articles would be greatly enhanced if they were resistant to the formation of fog or condensation on a surface of the article. In general, fog and condensation formation occurs under conditions of high humidity and high temperature or at interfacial boundaries where there is a large temperature and humidity difference. Coatings that reduce the tendency for surfaces to "fog up" have been reported. These so-called anti-fog coatings improve the wettability of a surface by allowing a thin layer of water film to form on the surface instead of discrete droplets. Known anti-fog coatings include, for example, coatings using ammonium soap, such as mixtures of an alkyl ammonium carboxylates with a surface active agent, for example, a sulfated or sulfonated fatty material; salts of sulfated alkyl aryloxypolyalkoxy alcohol; or alkylbenzene sulfonates. Other common anti-fog compositions require chemical crosslinking to form a cohesive film. Although less solvent is used, the chemical crosslinking can significantly affect film properties. A highly crosslinked coating can cause the coated film to be brittle whereas low crosslinking can result in chalking, i.e., a powdery film that degrades or disperses upon contact with an aqueous solution.

Prior anti-fogging formulations generally have low moisture absorptivity, long moisture release time, and/or poor water and solvent resistance. For example, water-soluble silicone resins synthesized from hydrophilic functional group-bearing silane compounds generally have poor water resistance, inadequate film hardness and poor weathering resistance. Some of these formulations also have inefficient fabrication processes, e.g. a long coat curing time. To be useful in most commercial applications, the anti-fog coating should possess high clarity and a long shelf life prior to coating, exhibit impact resistance properties suitable for the intended application, be able to absorb and release moisture simultaneously, and be able to resist water and conventional organic solvents, such as alcohols, alkylbenzenes (e.g., toluene), glycol ethers (e.g., propylene glycol monomethyl ether), and alkyl ketones (e.g., methyl ethyl ketone). Furthermore, it would be highly desirable to provide an anti-fogging composition that is environmentally friendly.

Accordingly, there remains a continuing need in the art for an anti-fogging composition that can overcome the above-described technical limitations.

BRIEF SUMMARY

One embodiment is an anti-fogging composition comprising a nanocellulose comprising cellulose nanofibrils, cellulose nanocrystals, or a combination thereof; and water.

Another embodiment is an article comprising a coating formed from the anti-fogging composition.

Another embodiment is a method of preparing an anti-fogging coating, the method comprising, applying the anti-fogging composition to at least a portion of a surface of a substrate to form a coating.

These and other embodiments are described in detail below.

BRIEF DESCRIPTION OF THE DRAWINGS

The following figures are of exemplary embodiments:

FIG. 1 is a digital photograph showing a bathroom mirror that has been exposed to a high humidity environment. The left side, labeled "1" is uncoated. The right side, labeled "2" was coated with the anti-fogging composition according to the present disclosure.

DETAILED DESCRIPTION

The present inventors have developed an anti-fogging composition comprising nanocellulose and water. As such, the anti-fogging compositions described herein are environmentally friendly, as the components are generally derived from natural products, which are biocompatible and non-toxic. Coatings prepared from the anti-fogging compositions are also durable, water proof, and offer a cost-effective alternative to other anti-fogging coatings.

One aspect of the present disclosure is an anti-fogging composition. The composition comprises a nanocellulose and water. The nanocellulose comprises cellulose nanofibrils, cellulose nanocrystals, or a combination thereof. In some embodiments, the nanocellulose comprises surface-oxidized cellulose nanofibrils ("oxidized cellulose nanofibrils"), surface-oxidized cellulose nanocrystals ("oxidized cellulose nanocrystals"), or a combination thereof. The surface-oxidized nanocellulose includes carboxyl groups, aldehyde groups, ketone groups, sulfonate groups, or a combination thereof present on the surface of the nanocellulose. The degree of oxidation can vary from, for example, 25 to 100%, for example from 80 to 100%. In some embodiments, the composition comprises cellulose nanocrystals, preferably surface-oxidized nanocrystals, that are not significantly aggregated. The cellulose nanocrystals generally have an average diameter of 1 to 100 nanometers (nm), for example 5 to 50 nm, for example 5 to 30 nm, for example 10 to 20 nm. The cellulose nanocrystals further have an average length of 50 to 750 nm, for example 75 to 500 nm, for example 90 to 300 nm, for example 100 to 200 nm. In some embodiments, the composition comprises cellulose nanofibrils, preferably surface-oxidized nanofibrils, that are not significantly aggregated. The cellulose nanofibrils generally have an average diameter of 1 to 100 nm, for example 5 to 50 nm, for example 5 to 30 nm, for example 10 to 20 nm. The cellulose nanofibrils further have an average length of 500 to 2500 nm, for example 750 to 2500 nm, for example 800 to 2250 nm, for example 1000 to 2000 nm.

The nanocellulose can be prepared by any method that is generally known. For example, the nanocellulose can be produced through acid hydrolysis, using sulfuric acid, hydrochloric acid, phosphoric acid, or hydrobromic acid. See, e.g., Chemical Reviews, 2010, 110, 3479-3500; U.S. Patent Publication No. 2010/0272819A1; and U.S. Pat. No. 5,629,055. Cellulose nanofibrils have been generally prepared by intensive mechanical treatment or a combination of enzyme or chemical pre-treatment with mechanical treatment. See, e.g., U.S. Pat. Nos. 8,871,056; 8,778,134; and 8,287,692. In some embodiments, the oxidized nanocellulose can be prepared by an acid-free method comprising contacting a cellulosic material (e.g., cellulose pulp) with an oxidizing agent (e.g., a hypohalite such as sodium hypochlorite), an alkali metal bromide (e.g., sodium bromide), and optionally a nitroxyl radical compound having the formula

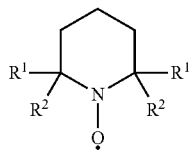

in an aqueous solution. $R^1$ and $R^2$ are independently at each occurrence a $C_{1-6}$ alkyl group, preferably methyl. The solution can have a pH of 8 to 12, or 9 to 12, or 10 to 12. The contacting provides an oxidized cellulosic material comprising oxidized cellulose nanocrystals and oxidized cellulose nanofibrils. An example of this method is further described in the working examples below.

The nanocellulose can be present in the anti-fogging composition in an amount of 0.1 to 10 weight percent, for example 0.1 to 8 weight percent, for example 0.1 to 5 weight percent, for example 0.1 to 1.5 weight percent based on the total weight of the anti-fogging composition. In some embodiments, the nanocellulose comprises cellulose nanofibrils, and is present in an amount of 0.1 to 1.5 weight percent based on the total weight of the anti-fogging composition. In some embodiments, the nanocellulose comprises cellulose nanocrystals, and is present in an amount of 0.1 to 8 weight percent based on the total weight of the anti-fogging composition.

The anti-fogging composition of the present disclosure further comprises water. The water can be present in an amount effective to provide a substantially transparent solution comprising the nanocellulose. In some embodiments, the water can be distilled water, deionized water, or reverse osmosis water. For example, the water can be present in an amount of 97 to 99.9 weight percent, based on the total weight of the anti-fogging composition. Within this range, the water can be present in an amount of at least 98 weight percent, or at least 99 weight percent. Also within this range, the water can be present in an amount of 99.55 weight percent or less, or 99.79 weight percent or less.

In some embodiments, the anti-fogging composition optionally further comprises a solvent different from water. In some embodiments, the solvent is at least partially miscible with water. In some embodiments, the anti-fogging composition can further include a solvent selected from $C_{1-6}$ alcohol (e.g., methanol, ethanol, isopropanol, and combinations thereof), acetone, ethylene glycol butyl ether, dipropylene glycol methyl ether, tetrahydrofuran, dimethyl sulfoxide, dimethylformamide, N-methyl-2-pyrrolidone, and combinations thereof. When present, the solvent can be included in the composition in a weight ratio relative to water of 0.01:1 to 1:1.

In some embodiments, the anti-fogging composition further includes a surfactant. The surfactant can be anionic, cationic, or nonionic. Mixtures of the foregoing can also be used. In some embodiments, the surfactant comprises a polyoxyalkylene, an organosiloxane, a $C_{3-20}$ perfluoroalkyl group, a quaternary ammonium surfactant, a $C_{4-24}$ fatty acid or an alkali metal salt thereof, or a combination thereof. In some embodiments, the surfactant comprises a $C_{4-24}$ fatty acid or an alkali metal salt thereof. In some embodiments, the surfactant comprises an alkali metal salt of coconut oil or corn oil. A particularly useful example of a surfactant comprising an alkali metal salt of coconut oil is potassium cocoate.

When present, the surfactant can be included in the anti-fogging composition in an amount of 0.01 to 1 weight percent, for example 0.25 to 1 weight percent, for example 0.4 to 0.7 weight percent, based on the total weight of the anti-fogging composition.

The anti-fogging composition can further optionally include a water-soluble polymer. The water-soluble polymer can include synthetic polymers, natural polymers, and combinations thereof. The water-soluble polymer can include but is not limited to synthetic polymers such as polyvinylpyrrolidone, polyvinyl alcohol, and poly(meth)acrylic acid, and natural polymers such as methyl cellulose, hydroxypropyl methylcellulose, xanthan gum, pectin, guar gum, carrageenan, chitosan, gum arabic, gelatin, chondroitin sulfate, hyaluronic acid, and sodium hyaluronic acid. Combinations of any of the foregoing synthetic and natural polymers are also contemplated. In some embodiments, the water-soluble polymer is selected from the group consisting of polyvinylpyrrolidone, polyvinyl alcohol, poly(meth)acrylic acid, methyl cellulose, hydroxypropyl methylcellulose, xanthan gum, pectin, guar gum, carrageenan, chitosan, gelatin, and combinations thereof. In some embodiments, the water-soluble polymer is a natural polymer comprising a polysaccharide. In an embodiment, the water-soluble polymer comprises xanthan gum.

When present, the water-soluble polymer can be included in the anti-fogging composition in an amount of 0.01 to 1 weight percent, for example 0.01 to 0.5 weight percent, for example 0.015 to 0.2 weight percent, based on the total weight of the anti-fogging composition.

In addition to the nanocellulose, water, surfactant, and water-soluble polymer, the anti-fogging composition can optionally further include a plurality of nanoparticles. In some embodiments, the nanoparticles comprise silica nanoparticles, zinc oxide nanoparticles, titanium dioxide nanoparticles, or a combination thereof. In some embodiments, the nanoparticles are silica nanoparticles. When the nanoparticles are included in the composition, the composition can further exhibit anti-scratch properties.

When present, the nanoparticles can be included in the anti-fogging composition in an amount of 10 to 75 weight percent, for example 20 to 50 weight percent, based on the total weight of the anti-fogging composition.

In some embodiments, the composition can optionally further comprise one or more additives that are generally known to be useful, with the proviso that the additive(s) are also selected so as to not significantly adversely affect a desired property of the anti-fogging composition. For example, the composition can further include one or more of hydrophilic film plasticizers, fungicidal, bactericidal and anti-microbial agents, cleaning solvents, light stabilizers, defoamers, and corrosion inhibitors.

In some embodiments, the anti-fogging composition excludes a silicone polymer or oligomer. For example, the composition described herein can include less than 0.1 weight percent, for example less than 0.01 weight percent of a silicone polymer or oligomer, preferably wherein the composition is devoid of a silicone polymer or oligomer.

In a specific embodiment, the anti-fogging composition comprises 0.1 to 1 weight percent of an nanocellulose comprising cellulose nanofibrils, cellulose nanocrystals, or a combination thereof, and 99 to 99.9 weight percent water.

In another specific embodiment, the anti-fogging composition comprises 0.1 to 1 weight percent of a nanocellulose comprising cellulose nanofibrils, cellulose nanocrystals, or a combination thereof, 0.01 to 1 weight percent of a surfactant, 0.01 to 1 weight percent of the water-soluble polymer, and 97 to 99.79 weight percent water. In another specific embodiment, the anti-fogging composition comprises 0.1 to 0.5 weight percent of a nanocellulose comprising cellulose nanofibrils, cellulose nanocrystals, or a combination thereof, 0.01 to 1 weight percent of a surfactant, 0.01 to 0.5 weight percent of the water-soluble polymer, and 98 to 99.55 weight percent water. In another specific embodiment, the anti-fogging composition comprises 0.1 to 0.5 weight percent of a nanocellulose comprising cellulose nanofibrils, 0.1 to 1 weight percent of a surfactant comprising an alkali metal salt of coconut oil, 0.01 to 0.5 weight percent of a water-soluble polymer comprising xanthan gum, and 98 to 99.55 weight percent water.

The anti-fogging composition can be prepared by any method that is generally known, for example by mixing the nanocellulose, the water, and, optionally, the surfactant, the water-soluble polymer, and the nanoparticles to provide the composition. In some embodiments, the order of addition of the components is not critical. In some embodiments, the components can be added to a portion of the water and mixed thoroughly. Subsequently, the remaining portion of the water, if any, can be added. When present, the additives can generally be added at any stage of the mixing.

Another aspect of the present disclosure is an article comprising a coating formed from the above-described anti-fogging composition. The coating can be formed on at least a portion of a surface of the article. In some embodiments, the coating is preferably uncrosslinked. In some embodiments, the coating is disposed directly on at least a portion of a surface of the article. In some embodiments, the coating formed from the anti-fogging composition can have a thickness of 1 nanometer to several micrometers, for examples 100 nanometers to several micrometers, for example 100 nanometers to 2 micrometers, for example 100 nanometers to 1 micrometer. In some embodiments, the article can be a transparent article. In some embodiments, the article is a mirror, a window (e.g., a car window, a building window, an airplane window, and the like), eyeglasses, sunglasses, goggles, safety glasses, a helmet, a visor, a windshield, a lens (e.g., a camera lens, a telescope lens, a microscope lens, an endoscopic lens, a laparoscopic lens, and the like), a display screen, a freezer door, a greenhouse roof, a label, a coating, a cladding, a container, a jar, a bottle, a film, an electronic device, a sensor, a sign, a reflector, a photograph, a poster, or a painted surface, a light emitting device (e.g., a LED or an organic light emitting device (OLED)).

Another aspect of the present disclosure is a method of preparing an anti-fogging coating. The method comprises applying the above-described anti-fogging composition to at least a portion of a surface of a substrate to form a coating. The applying can be by any means that is generally known, for example solution coating, spray coating, wiping using a saturated sponge or cloth, or a combination of any of the foregoing. Applying the composition by solution coating can include methods such as solvent casting, spin coating, drop casting, roller coating, wire-bar coating, dip or immersion coating, ink jetting, doctor blading, flow coating, and the like. The process of applying the coating can optionally be repeated until the desired coating thickness and/or desired surface coverage is obtained. After each application, the coating can be dried to remove at least a portion of the water and optionally, any solvent that may be present. For example, after the composition has been applied to the substrate, the water is evaporated at room temperature by air drying. More rapid evaporation can be achieved, if desired, by placing the coated substrate in an oven at a temperature of from 50° to 100° C. In some embodiments, excess composition can be removed from the coating. For example, the coating can be rinsed with a solvent, for example, water, to remove excess material. In some embodiments, the surface of the substrate is a glass surface, a ceramic surface, a metal surface, or a polymeric surface (e.g., polyester, polycarbonate, poly(meth)acrylate, and the like). In some embodiments, the surface of the substrate is a glass surface, preferably a clean glass surface. In some embodiments, the coating can be formed following removal of at least a portion of the water (e.g., by drying, evaporating, and the like).

The invention is further illustrated by the following non-limiting examples.

EXAMPLES

An anti-fogging composition was prepared using the materials described in Table 1.

TABLE 1

| Component | Description |
|---|---|
| Cellulose nanofibrils | Cellulose nanofibrils were prepared from cellulose pulp according to the procedure described below. |
| Xanthan gum | CAS Reg. No. 11138-66-2; obtained from TIC Gums |
| Potassium Cocoate | CAS Reg. No. 61789-30-8; obtained from Lubrizol |
| Gelatin | CAS Reg. No. 9000-70-8; obtained from Sigma-Aldrich |
| Capstone FS-31 | Nonionic Fluorosurfactant; obtained from Dupont |

Preparation of Cellulose Nanofibrils (CNF) and Nanocrystals (CNC)

A solution of mechanically treated cellulose pulp (37.5 grams, 2.67% solid content) was dispersed in water (62.5 milliliters) containing sodium bromide (0.1 grams) and, optionally, 2,2,6,6-tetramethyl-1-piperidine-N-oxy (TEMPO, 0.016 grams). A solution of sodium hypochlorite (2.1 grams, active chlorine 10-15%) was added to the suspension. Sodium hydroxide (5.5 grams, 0.5 M in water) was introduced to the mixture to adjust pH to higher than 10. The reaction mixture was stirred for 20 hours at room temperature, then centrifuged at 4000 rpm for 15 minutes. The precipitate isolated following the initial centrifugation was further washed with deionized water and centrifuged the remove residual salts and TEMPO. This washing process was repeated three times. The precipitate was then dispersed in 80 milliliters of water, and sonicated for 50 minutes to disintegrate the nanocellulose into single nanofibrils. A translucent aqueous mixture was obtained following sonication. The mixture was centrifuged at 4000 rpm for 15 minutes, and the cellulose nanofibrils in water were collected as the transparent supernatant.

Preparation of Anti-Fogging Composition

An anti-fogging composition was prepared by mixing the desired components in the amounts shown in Table 2. The amount of each component is shown in weight percent based on the total weight of the composition.

TABLE 2

| Components | Example 1 | Example 2 | Example 3 | Example 4 | Example 5 | Example 6 |
|---|---|---|---|---|---|---|
| CNC | 2 | 0 | 0 | 0 | 0.6 | 0 |
| CNF | 0 | 0.4 | 1 | 0.4 | 0 | 0.8 |
| Capstone FS-31 | 0.3 | 0 | 0 | 0 | 0 | 0 |
| Potassium cocoate | 0 | 0.4 | 0 | 0.4 | 0 | 0 |
| Xanthan Gum | 0.2 | 0.1 | 0 | 0 | 0 | 0 |
| Gelatin | 0 | 0 | 0 | 0 | 0.4 | 0 |
| Silica Nanoparticles | 0 | 0 | 0 | 0 | 0 | 0.4 |
| Water | 97.5 | 99.1 | 99 | 99.2 | 99 | 98.8 |

The anti-fogging composition of Example 2 was coated on a bathroom mirror. As shown in FIG. 1, half of a bathroom mirror was left uncoated (side "1") and half was coated with the composition described above (side "2"). FIG. 1 is a digital photograph of the mirror after exposure to a high humidity environment for 30 minutes, where it can be seen that side 1 of the mirror (uncoated) fogged, and side 2 of the mirror (coated) did not fog. Therefore, the composition provided an anti-fogging effect in a high humidity bathroom environment. The coating was further observed to last for several weeks (for example, 2 to 3 weeks).

The invention includes at least the following embodiments.

Embodiment 1

An anti-fogging composition, comprising a nanocellulose comprising cellulose nanofibrils, cellulose nanocrystals, or a combination thereof; and water.

Embodiment 2

The anti-fogging composition of embodiment 1, further comprising a surfactant.

Embodiment 3

The anti-fogging composition of embodiment 1 or 2, further comprising a water-soluble polymer.

Embodiment 4

The anti-fogging composition of any of embodiments 1 to 3, further comprising a plurality of nanoparticles.

Embodiment 5

The anti-fogging composition of any of embodiments 1 to 4, further comprising a surfactant, a water-soluble polymer, and optionally, a plurality of nanoparticles.

Embodiment 6

The anti-fogging composition of any of embodiments 2 to 5, wherein the surfactant comprises a polyoxyalkylene, an organosiloxane, a $C_{3-20}$ perfluoroalkyl group, a $C_{4-24}$ fatty acid or an alkali metal salt thereof, or a combination thereof.

Embodiment 7

The anti-fogging composition of any of embodiments 2 to 6, wherein the surfactant is an alkali metal salt of coconut oil.

Embodiment 8

The anti-fogging composition of any of embodiments 3 to 7, wherein the water-soluble polymer comprises polyvinylpyrrolidone, polyvinyl alcohol, polyacrylic acid, methyl cellulose, hydroxypropyl methylcellulose, xanthan gum, pectin, guar gum, carrageenan, chitosan, gelatin, gum arabic, or a combination thereof.

Embodiment 9

The anti-fogging composition of any of embodiments 3 to 8, wherein the water-soluble polymer comprises xanthan gum.

Embodiment 10

The anti-fogging composition of any of embodiments 4 to 9, wherein the nanoparticles comprise silica nanoparticles, zinc oxide nanoparticles, titanium dioxide nanoparticles, or a combination thereof.

Embodiment 11

The anti-fogging composition of any of embodiments 1 to 10, comprising 0.1 to 10 weight percent nanocellulose.

Embodiment 12

The anti-fogging composition of any of embodiments 1 to 11, comprising 0.1 to 1.5 weight percent nanocellulose comprising cellulose nanofibrils.

Embodiment 13

The anti-fogging composition of any of embodiments 1 to 11, comprising 0.1 to 8 weight percent nanocellulose comprising cellulose nanocrystals.

Embodiment 14

The anti-fogging composition of any of embodiments 1 to 13, comprising 0.1 to 1.5 weight percent nanocellulose; and 98.5 to 99.9 weight percent water.

Embodiment 15

The anti-fogging composition of any of embodiments 2 to 13, comprising 0.1 to 1.5 weight percent of the nanocellulose; 0.01 to 1 weight percent of the surfactant; 0.01 to 1 weight percent of the water-soluble polymer; and 96.5 to 99.88 weight percent water; wherein weight percent is based on the total weight of the composition.

Embodiment 16

The anti-fogging composition of any of embodiments 2 to 15, comprising 0.1 to 0.5 weight percent nanocellulose; 0.25 to 1 weight percent of the surfactant; 0.01 to 0.5 weight percent of the water-soluble polymer; and 98 to 99.55 weight percent water; wherein weight percent is based on the total weight of the composition.

Embodiment 17

The antifogging compositions of embodiment 16, wherein the nanocellulose comprises cellulose nanofibrils; the surfactant is an alkali metal salt of coconut oil; and the water-soluble polymer is xanthan gum.

Embodiment 18

An article comprising a coating formed from the anti-fogging composition of any of embodiments 1 to 17.

Embodiment 19

The article of embodiment 18, wherein the article is at least partially transparent.

Embodiment 20

The article of embodiment 18 or 19, wherein the article is a mirror, a window, eyeglasses, sunglasses, goggles, safety glasses, a helmet, a visor, a windshield, a lens, a display screen, a freezer door, a greenhouse roof, a label, a coating, a cladding, a container, a jar, a bottle, a film, an electronic device, a sensor, a sign, a reflector, a photograph, a poster, or a painted surface.

Embodiment 21

A method of preparing an anti-fogging coating, the method comprising applying the anti-fogging composition of any of embodiments 1 to 17 to at least a portion of a surface of a substrate to form a coating.

Embodiment 22

The method of embodiment 21, wherein applying the composition comprises solution coating, spray coating, wiping using a saturated sponge or cloth, or a combination thereof.

Embodiment 23

The method of embodiment 21 or 22, wherein the surface is a glass surface, a ceramic surface, a metal surface, or a polymeric surface.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety, including priority U.S. Patent Application No. 62/240,037, filed Oct. 12, 2015. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:
1. A method of preventing fog on a surface, the method comprising:
 applying an anti-fogging composition to the surface, wherein the anti-fogging composition comprises
  a nanocellulose comprising cellulose nanofibrils, cellulose nanocrystals, or a combination thereof;
  a surfactant:
  a water-soluble polymer; and
  water; and
 removing at least a portion of the water from the surface to provide a coating disposed on at least a portion of the surface, wherein the coating has a thickness of 100 nanometers to 2 micrometers.
2. The method of claim 1, wherein applying the anti-fogging composition comprises solution coating, spray coating, wiping using a saturated sponge or cloth, or a combination thereof.
3. The method of claim 1, wherein the surface is a glass surface, a ceramic surface, a metal surface, or a polymeric surface.
4. The method of claim 1, wherein the composition further comprises a plurality of nanoparticles.
5. The method of claim 4, wherein the anti-fogging composition comprises
 0.1 to 0.5 weight percent nanocellulose;
 0.25 to 1 weight percent of the surfactant;
 0.01 to 0.5 weight percent of the water-soluble polymer; and
 98 to 99.55 weight percent water;
 wherein weight percent is based on the total weight of the composition.
6. The method of claim 5, wherein
 the nanocellulose comprises cellulose nanofibrils;
 the surfactant is an alkali metal salt of coconut oil; and
 the water-soluble polymer is xanthan gum.
7. The method of claim 1, wherein the surfactant comprises a polyoxyalkylene, an organosiloxane, a $C_{3-20}$ per- fluoroalkyl group, a $C_{4-24}$ fatty acid or an alkali metal salt thereof, or a combination thereof.

8. The method of claim 1, wherein the surfactant is an alkali metal salt of coconut oil.

9. The method of claim 1, wherein the water-soluble polymer comprises polyvinylpyrrolidone, polyvinyl alcohol, polyacrylic acid, methyl cellulose, hydroxypropyl methylcellulose, xanthan gum, pectin, guar gum, carrageenan, chitosan, gelatin, gum arabic, or a combination thereof.

10. The method of claim 1, wherein the water-soluble polymer comprises xanthan gum.

11. The method of claim 4, wherein the nanoparticles comprise silica nanoparticles, zinc oxide nanoparticles, titanium dioxide nanoparticles, or a combination thereof.

12. The method of claim 1, wherein the anti-fogging composition comprises 0.1 to 10 weight percent nanocellulose.

13. The method of claim 1, wherein the anti-fogging composition comprises 0.1 to 1.5 weight percent nanocellulose comprising cellulose nanofibrils.

14. The method of claim 1, wherein the anti-fogging composition comprises 0.1 to 8 weight percent nanocellulose comprising cellulose nanocrystals.

15. The method of claim 1, wherein the anti-fogging composition comprises
   0.1 to 1.5 weight percent of the nanocellulose;
   0.01 to 1 weight percent of the surfactant;
   0.01 to 1 weight percent of the water-soluble polymer; and
   96.5 to 99.88 weight percent water;
   wherein weight percent is based on the total weight of the composition.

* * * * *